United States Patent
Iwamoto et al.

(10) Patent No.: US 11,952,029 B2
(45) Date of Patent: Apr. 9, 2024

(54) DELIVERY RACK AND DELIVERY VEHICLE

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 17/568,416

(22) Filed: Jan. 4, 2022

(65) Prior Publication Data

US 2022/0250669 A1    Aug. 11, 2022

(30) Foreign Application Priority Data

Feb. 5, 2021   (JP) ................. 2021-017491

(51) Int. Cl.
   *B62B 3/00*   (2006.01)
   *E05B 47/00*  (2006.01)
   *E05B 65/462* (2017.01)

(52) U.S. Cl.
   CPC .......... *B62B 3/005* (2013.01); *E05B 47/0001* (2013.01); *E05B 65/462* (2013.01)

(58) Field of Classification Search
   CPC ....... B62B 3/005; B62B 5/005; B62B 5/0079; E05B 47/0001; E05B 65/462;
   (Continued)

(56) References Cited

U.S. PATENT DOCUMENTS

| 606,556 A * | 6/1898 | Keith ................. E05B 65/462 52/234 |
| 3,175,872 A * | 3/1965 | Sullivan ............... A47B 47/04 312/219 |

(Continued)

FOREIGN PATENT DOCUMENTS

| DE | 20014623 U1 * | 12/2000 | ........... E05B 65/462 |
| FR | 2265311 A1 * | 10/1975 | |

(Continued)

*Primary Examiner* — James A Shriver, II
*Assistant Examiner* — Michael T. Walsh
(74) *Attorney, Agent, or Firm* — Oliff PLC

(57) ABSTRACT

A rack includes: a casing; M pairs of supports that are provided inside the casing so as to extend in a depth direction and arrayed at regular intervals in a predetermined direction; and a lock mechanism. The rack can house all returnable containers of one or more prespecified sizes along the respective pairs of supports. The M pairs of supports are arrayed in N rows in an orthogonal direction orthogonal to the predetermined direction. The lock mechanism is configured such that moving first and second shafts that are provided for the respective rows and for the respective tiers, respectively, so as to be movable in the predetermined direction can switch between engagement and disengagement between branches of the first and second shafts and first and second holes, respectively, of the returnable containers.

7 Claims, 11 Drawing Sheets

(58) Field of Classification Search
CPC ..... E05B 47/0004; B62D 63/02; B62D 63/04; B60P 7/06
See application file for complete search history.

(56) References Cited

U.S. PATENT DOCUMENTS

| | | | | |
|---|---|---|---|---|
| 4,246,769 | A * | 1/1981 | McLaughlin | E05B 65/462 |
| | | | | 312/219 |
| 10,697,204 | B1 * | 6/2020 | Chen | A47B 88/919 |
| 11,130,511 | B2 * | 9/2021 | Abohammdan | B62B 3/005 |

FOREIGN PATENT DOCUMENTS

| | | |
|---|---|---|
| JP | 2006-037544 A | 2/2006 |
| JP | 2017-145117 A | 8/2017 |

* cited by examiner

FIG. 4

| STEM TO BE DRIVEN | TOP LEFT ONE UNLOCKED, THE OTHERS LOCKED | MIDDLE LEFT ONE UNLOCKED, THE OTHERS LOCKED | BOTTOM LEFT ONE UNLOCKED, THE OTHERS LOCKED | TOP RIGHT ONE UNLOCKED, THE OTHERS LOCKED | MIDDLE RIGHT ONE UNLOCKED, THE OTHERS LOCKED | BOTTOM RIGHT ONE UNLOCKED, THE OTHERS LOCKED | ALL UNLOCKED | ALL LOCKED |
|---|---|---|---|---|---|---|---|---|
| 31a (32a-1, 32a-2) | UP | UP | UP | DOWN | DOWN | DOWN | UP | DOWN |
| 31b (32b-1, 32b-2) | DOWN | DOWN | DOWN | UP | UP | UP | UP | DOWN |
| 31c (32c-1, 32c-2) | UP | DOWN | DOWN | UP | DOWN | DOWN | UP | DOWN |
| 31d (32d-1, 32d-2) | DOWN | UP | DOWN | DOWN | UP | DOWN | UP | DOWN |
| 31e (32e-1, 32e-2) | DOWN | DOWN | UP | DOWN | DOWN | UP | UP | DOWN |

LOCKED OR UNLOCKED STATE

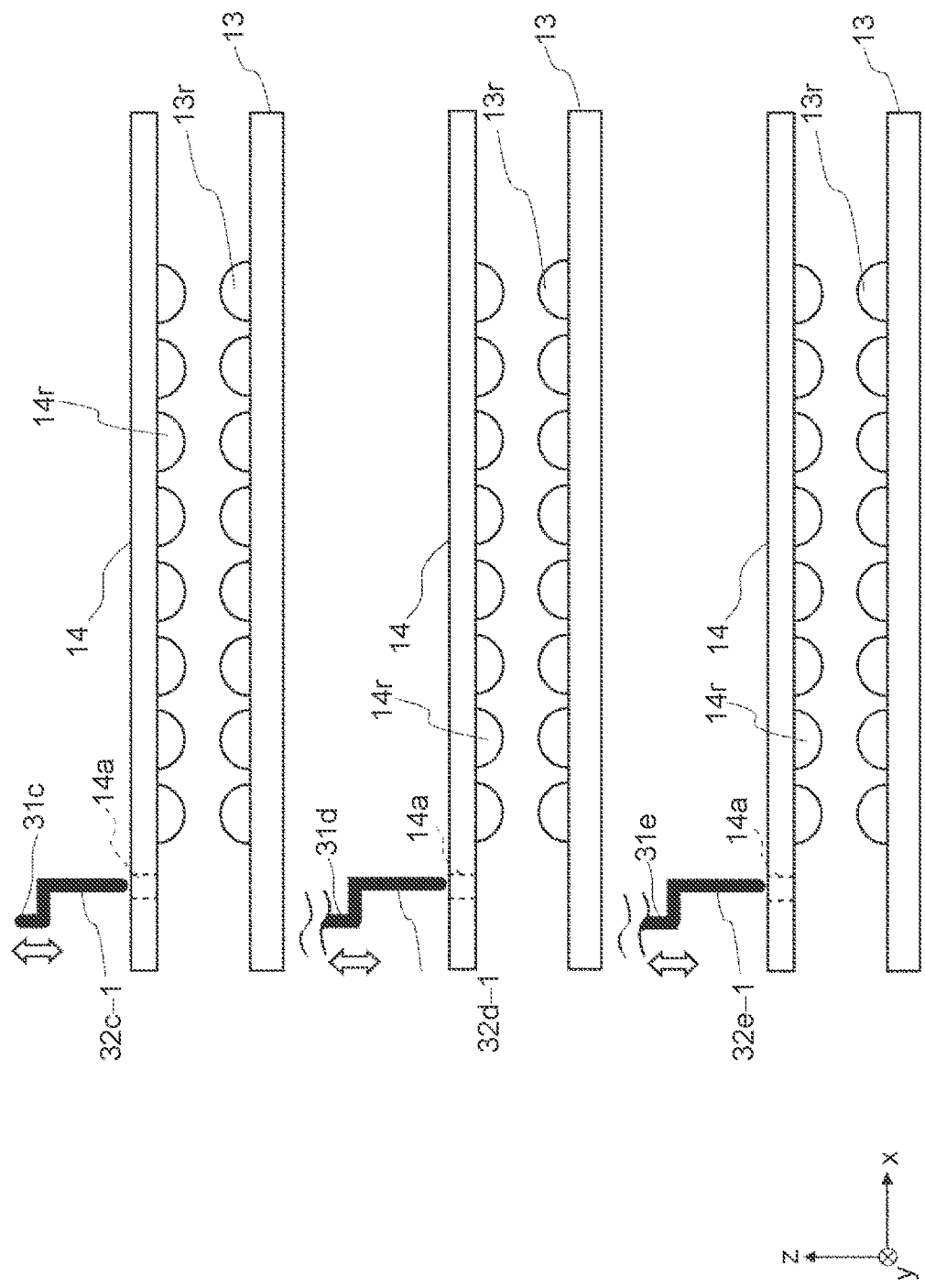

DELIVERY RACK AND DELIVERY VEHICLE

CROSS-REFERENCE TO RELATED APPLICATION

This application claims priority to Japanese Patent Application No. 2021-017491 filed on Feb. 5, 2021, incorporated herein by reference in its entirety.

BACKGROUND

1. Technical Field

This disclosure relates to a delivery rack and a delivery vehicle.

2. Description of Related Art

Delivery of articles is desired to be automated and streamlined. The technique of delivering articles by housing them in returnable containers (also called returnable boxes) is widely known. Japanese Unexamined Patent Application Publication No. 2017-145117 (JP 2017-145117 A) discloses an article carrying apparatus in which a lock mechanism is disposed at a front-side end of an article housed in a housing part.

SUMMARY

The present inventors have been developing a delivery rack and a delivery vehicle in which returnable containers of one or more prespecified sizes can be housed while being supported so as to be slidable along respective pairs of supports that are provided inside a casing so as to extend in a depth direction and arrayed at regular intervals in an up-down direction or a left-right direction.

In the process, the present inventors have been working on a lock mechanism that can independently lock and unlock the returnable containers housed in the rack. For example, it is conceivable to provide an electric lock, such as a solenoid lock, for each pair of supports, which, however, raises a problem that the manufacturing costs of the delivery rack and the delivery vehicle increase due to a driving source (actuator or the like) provided for each electric lock.

For example, in the article carrying apparatus described in JP 2017-145117 A, the lock mechanism is provided for each article housed in the housing part. If a solenoid lock is provided for each of the housing parts corresponding to the respective articles in this article carrying apparatus, the manufacturing cost increases due to a driving source required for each solenoid lock.

Having been made in view of these circumstances, this disclosure provides a delivery rack and a delivery vehicle in which all returnable containers of one or more prespecified sizes can be housed in the rack, and which allow each returnable container to be independently and easily locked and unlocked while keeping the manufacturing cost down as much as possible.

A delivery rack according to one aspect of this disclosure includes: a casing; M pairs of supports, with M being an integer not less than three, that are provided inside the casing so as to extend in a depth direction and arrayed in M tiers at regular intervals in a predetermined direction that is one of an up-down direction and a left-right direction; and a lock mechanism that locks returnable containers housed while being supported so as to be slidable along the respective M pairs of supports. The delivery rack is able to house all the returnable containers of one or more prespecified sizes. The M pairs of supports are arrayed in N rows, with N being an integer not less than two, in an orthogonal direction orthogonal to the predetermined direction of the casing, and the delivery rack is able to house a maximum of (M×N) returnable containers. The lock mechanism includes: N first shafts that are provided for the respective rows so as to be movable in the predetermined direction, and each have a stem that is provided so as to extend across all the M pairs of supports arrayed in the predetermined direction and M branches that branch off from the stem so as to correspond to the respective M pairs of supports; and M second shafts that are provided for the respective tiers so as to be movable in the predetermined direction, and each have a stem that is provided so as to extend across all the N rows of supports arrayed in the orthogonal direction of the casing and N branches that branch off from the stem so as to correspond to the respective N rows of supports. The returnable containers are each provided with a first hole that engages with the branch of the first shaft and a second hole that engages with the branch of the second shaft. Moving the first shafts in the predetermined direction enables switching between engagement and disengagement between the branches of the first shafts and the first holes, and moving the second shafts in the predetermined direction enables switching between engagement and disengagement between the branches of the second shafts and the second holes.

A delivery vehicle according to one aspect of this disclosure is a delivery vehicle including a rack. The rack has: a casing; M pairs of supports, with M being an integer not less than three, that are provided inside the casing so as to extend in a depth direction and arrayed in M tiers at regular intervals in a predetermined direction that is one of an up-down direction and a left-right direction; and a lock mechanism that locks returnable containers housed while being supported so as to be slidable along the respective M pairs of supports. The rack is able to house all the returnable containers of one or more prespecified sizes. The M pairs of supports are arrayed in N rows, with N being an integer not less than two, in an orthogonal direction orthogonal to the predetermined direction of the casing, and the rack is able to house a maximum of (M×N) returnable containers. The lock mechanism includes: N first shafts that are provided for the respective rows so as to be movable in the predetermined direction, and each have a stem that is provided so as to extend across all the M pairs of supports arrayed in the predetermined direction and M branches that branch off from the stem so as to correspond to the respective M pairs of supports; and M second shafts that are provided for the respective tiers so as to be movable in the predetermined direction, and each have a stem that is provided so as to extend across all the N rows of supports arrayed in the orthogonal direction of the casing and N branches that branch off from the stem so as to correspond to the respective N rows of supports. The returnable containers are each provided with a first hole that engages with the branch of the first shaft and a second hole that engages with the branch of the second shaft. Moving the first shafts in the predetermined direction enables switching between engagement and disengagement between the branches of the first shafts and the first holes, and moving the second shafts in the predetermined direction enables switching between engagement and disengagement between the branches of the second shafts and the second holes.

As described above, in one aspect of this disclosure, the rack capable of housing all the returnable containers of one or more prespecified sizes adopts the configuration in which moving each of the N first shafts and the M second shafts in the predetermined direction can release the lock on one of the returnable containers. Thus, this configuration has fewer parts that are activated to release the lock. It is therefore possible to independently and easily lock and unlock each returnable container while keeping the manufacturing cost down as much as possible.

Protrusions that protrude from the returnable container toward outer sides in the orthogonal direction may slide over the supports, and the first hole and the second hole may be provided in the protrusions. In this configuration, the returnable containers can be locked using the protrusions thereof.

The lock mechanism may have driving sources that each separately and electrically drive one among the N first shafts and the M second shafts. Compared with a configuration of a lock mechanism in which a driving source is provided for each of (M×N) pairs of supports, this configuration can reduce the number of the driving sources by {M×N−(M+N)}. It is therefore possible to independently lock and unlock each returnable container while keeping the manufacturing cost of the delivery rack down.

The delivery vehicle may be an autonomous vehicle. This configuration can reduce delivery costs.

This disclosure can provide a delivery rack and a delivery vehicle in which all returnable containers of one or more prespecified sizes can be housed in the rack, and which allow each returnable container to be independently and easily locked and unlocked while keeping the manufacturing cost down as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing relationships between stems to be driven and driving directions thereof and locked and unlocked states in the lock mechanism of FIG. 3;

FIG. 5 is a schematic side view showing one example of a rail and the lock mechanism in the delivery vehicle according to the first embodiment;

DETAILED DESCRIPTION OF EMBODIMENTS

Figure 1:
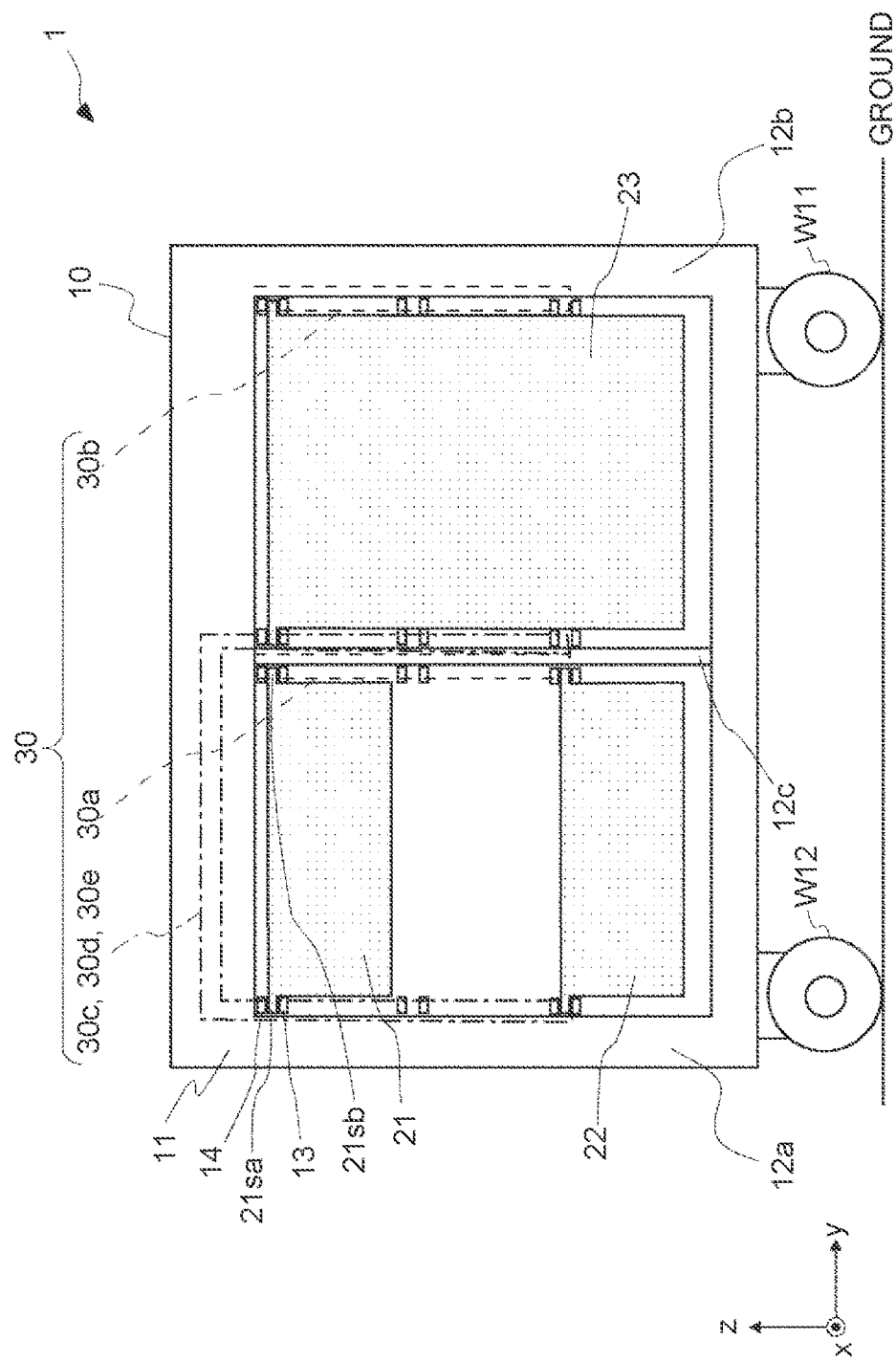
FIG. 1 is a schematic side view showing one example of a delivery vehicle according to a first embodiment.

Specific embodiments will be described in detail below with reference to the drawings. The same or corresponding elements in the drawings are denoted by the same reference signs, and overlapping description will be omitted as necessary to clarify the description.

First Embodiment

FIG. 1 is a schematic side view showing one example of a delivery vehicle according to a first embodiment. The right-handed xyz orthogonal coordinate system shown in FIG. 1 and other drawings is, of course, for the convenience of describing positional relationships among components. Normally, a z-axis positive direction is a vertically upward direction and an xy-plane is a horizontal plane, which applies to all the drawings.

As shown in FIG. 1, a delivery vehicle 1 according to this embodiment is a vehicle that includes a rack 10 and two pairs of wheels W11, W12 and carries articles. The two pairs of wheels W11, W12 are rotatably fixed on a lower side of a casing 11 of the rack 10 and driven by a driving source (not shown), such as a motor. Of course, the number of wheels is not limited to a particular number, and another configuration can also be adopted, such as a configuration in which no wheels are provided and the delivery vehicle 1 is floated and moved using high-pressure air.

Here, the delivery vehicle 1 can include a control unit (not shown) that performs various modes of control relating to the rack 10 etc. These various modes of control can include control of the driving of the wheels W11, W12 in the delivery vehicle 1, and control of the engagement and release of lock (locking and unlocking) by a lock mechanism 30 to be described later. The control unit can include arithmetic units that are each a central processing unit (CPU), for example, and a storage unit, such as a random-access memory (RAM) or a read-only memory (ROM), that stores various control programs, data, etc. Thus, the control unit can function as a computer. The control unit can include an integrated circuit in its configuration.

The rack 10 provided in the delivery vehicle 1 according to the embodiment is a rack that can house all returnable containers 21, 22, 23 etc. of two or more prespecified sizes. In FIG. 1 that is a side view, the returnable containers 21 to 23 are indicated by hatching to help understanding. The same applies to FIG. 9 and FIG. 11 to be described later.

An article to be delivered is delivered by being housed in a returnable container sized to be able to house that article. The returnable containers to be housed, including the returnable containers 21, 22, 23, are not limited to any type of containers; for example, the returnable containers are made of plastic, cardboard, wood, or metal and repeatedly used. While a returnable container itself can constitute an article, normally, an article is delivered in a state of being housed in a returnable container.

As shown in FIG. 1, the rack 10 includes the casing 11 and M pairs of rails 13 that are provided inside the casing 11 so as to extend in a depth direction (x-axis direction) and arrayed at regular intervals in a height direction (z-axis direction). In the delivery vehicle 1, the casing 11 constitutes a part of a vehicle body. The rails 13 are one example of supports, and here an example where three pairs of rails 13 are provided is described. At a minimum, M (M is an integer not less than three) pairs of supports should be provided inside the casing 11 so as to extend in the depth direction and arrayed in M tiers at regular intervals (hereinafter referred to as "intervals B") in the height direction (the up-down direction).

In this embodiment, the returnable containers 21 to 23 of prespecified sizes are equal in the width in the y-axis direction and the depth in the x-axis direction. However, the returnable containers 21, 22 and the returnable container 23 are different from each other in the height in the z-axis direction. The height of the returnable containers 21, 22 having the smallest size is designed according to the interval between the rails 13 that are adjacent to each other in the z-axis direction, i.e., the interval B. Of course, the height of the returnable containers 21, 22 is smaller than the interval B between these rails 13. The height of the returnable container 23 is designed to be about three times as large as the height of the returnable container 21. Thus, the heights of the returnable containers of two or more prespecified sizes are designed to be about integral multiples of the interval between the rails 13 that are adjacent to each other in the z-axis direction.

While the returnable containers have two sizes in this example of the configuration shown in FIG. 1, the number of sizes may be three or larger. In the example of FIG. 1, other than the returnable containers 21 to 23, for example, a returnable container with a height about twice as large as that of the returnable container 21 may be separately provided.

The rack 10 further has auxiliary parts 14 that are provided so as to face the rails 13. The rails 13 and the auxiliary parts 14 are each provided so as to rise from an inner surface of the casing 11 or a partition plate 12c in a substantially perpendicular direction.

The M pairs of rails 13 are arrayed in N (N is an integer not less than two) rows in a width direction of the casing 11 (an orthogonal direction orthogonal to the up-down direction). Thus, the rack 10 can house a maximum of (M×N) returnable containers. In the example of the configuration shown in FIG. 1, M=3 and N=2.

The rack 10 includes the partition plate 12c for separating rows to provide M pairs of rails 13 in each of the N rows. As shown in FIG. 1, the partition plate 12c is provided parallel to a front plate 12b and a back plate 12a constituting parts of the casing 11 (i.e., parallel to an xz-plane) so as to extend from one side to the other side of the casing 11. Here, the partition plate 12c is provided such that the interval between the front plate 12b of the casing 11 and the adjacent partition plate 12c, and the interval between the back plate 12a of the casing 11 and the adjacent partition plate 12c (and the interval between partition plates, when N is an integer not less than three) are equal.

Thus, in the rack 10, the M pairs of rails 13 are provided so as to extend in the depth direction (x-axis direction) in each of the rows defined by inner surfaces (the front plate 12b and the back plate 12a) of the casing 11 and the partition plate 12c, and are arrayed at regular intervals B in the height direction (z-axis direction). Therefore, in this example of the configuration shown in FIG. 1, all returnable containers of any size can be housed along the rails 13 if the width thereof is nearly equal to the width of an inside of the casing 11 and the height thereof is nearly an integral multiple of (in this example, one to three times) the interval B in the height direction. As a result, this example of the configuration can streamline the delivery using the returnable containers 21 to 23 of two or more prespecified sizes.

Next, housing of the returnable containers using the rails 13 in this example of the configuration will be specifically described.

First, the casing 11 has a configuration in which a top plate provided on a positive side in the z-axis direction, a bottom plate provided on a negative side in the z-axis direction, the front plate 12b provided on a positive side in the y-axis direction, and the back plate 12a provided on a negative side in the y-axis direction are integrally formed. Thus, both lateral sides of the casing 11 are open to allow the returnable containers 21 to 23 to be put in and out. Alternatively, doors that can be opened and closed may be provided on both lateral sides of the casing 11 that are open. One of the lateral sides of the casing 11 may be closed.

Each pair of rails 13 is provided so as to rise respectively from the front plate 12b of the casing 11 and the partition plate 12c or respectively from the back plate 12a and the partition plate 12c in a substantially perpendicular direction. Since the rails 13 should be able to at least support the returnable containers 21 to 23, the rails 13 may be provided so as to extend discontinuously in the depth direction (x-axis direction). Alternatively, instead of the rails 13, short supports may be disposed so as to line up in the depth direction (x-axis direction). Further, a configuration in which the supports are formed by magnets and partially or entirely attract the returnable containers 21 to 23 may be adopted.

The returnable container 21 can be put in and out as protrusions 21sa, 21sb protruding from the returnable container 21 toward outer sides in a width direction slide over the pair of rails 13 that are adjacent to the returnable container 21 and face each other. Here, the protrusions 21sa, 21sb of the returnable container 21 are housed in a state of being placed on the rails 13. To thus house each of the protrusions 21sa, 21sb, the auxiliary part 14 that presses the protrusion 21sa or 21sb so as to be held between the rail 13 and the auxiliary part 14 is provided. The auxiliary part 14 is provided so as to face the rail 13 in the z-axis direction. Each pair of rails 13 and each pair of auxiliary parts 14 corresponding to the respective protrusions 21sa, 21sb are provided so as to rise respectively from the back plate 12a and the partition plate 12c in a substantially perpendicular direction. The returnable containers 22, 23 are put in and out in the same manner by sliding over the rails 13.

Next, the lock mechanism 30 that is one of the main features of this embodiment will be described. In this embodiment, the rack 10 includes the lock mechanism 30 that locks the returnable containers 21 to 23 each housed while being supported so as to be slidable along one of the M pairs of rails 13.

For example, the lock mechanism 30 can be separately provided as a mechanism 30a located on a side, facing the back plate 12a, of the partition plate 12c, a mechanism 30b located on a side, facing the partition plate 12c, of the front plate 12b, and a mechanism 30c, a mechanism 30d, and a mechanism 30e that lock a top tier, a middle tier, and a bottom tier, respectively, in the row on the side of the back plate 12a (left row). The mechanism 30a is a mechanism that locks the top tier, the middle tier, and the bottom tier of the left row all at once, and the mechanism 30b is a mechanism that locks the top tier, the middle tier, and the bottom tier of the row on the side of the front plate 12b (right row) all at once. The mechanism 30a, the mechanism 30b, and the mechanisms 30c to 30e can be provided roughly in regions surrounded by the broken lines in FIG. 1. While an example in which all the mechanisms 30a to 30e are located at positions on the negative side in the x-axis direction of FIG. 1 will be described, the positions of the respective mechanisms in the x-axis direction may be any positions that correspond to the positions of holes in the returnable containers 21 to 23 to be described later, and all or some of the positions of the mechanisms 30a to 30e in the x-axis direction can be varied from each other.

Figure 2:
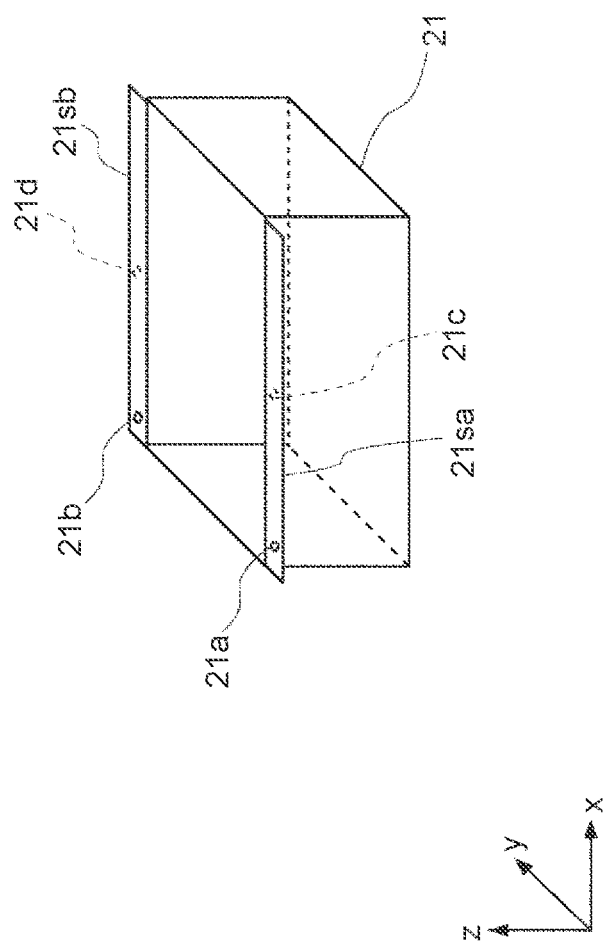
FIG. 2 is a schematic perspective view showing one example of a returnable container housed in the delivery vehicle according to the first embodiment.

Before details of the lock mechanism 30 are described, first, an example of the configuration of the returnable container 21 adapted to the mechanisms 30a to 30e will be described with reference to FIG. 2. In terms of delivery operation, it is desirable that the other containers including the returnable containers 22, 23 have basically the same shape except for their sizes. FIG. 2 is a schematic perspective view showing one example of a returnable container housed in the rack 10 of the delivery vehicle 1 according to the first embodiment.

As its shape is illustrated in FIG. 2, the returnable container 21 can have the protrusions 21sa, 21sb that allow the returnable container 21 to slide over the rails 13. Thus, the returnable container 21 can be configured such that the protrusions 21sa, 21sb protruding from the returnable container 21 toward the outer sides in the width direction slide over the rails 13. Here, the width direction refers to a direction that is orthogonal to the up-down direction and, of course, orthogonal also to the depth direction since the protrusions slide over the rails 13.

Further, as shown in FIG. 2, the protrusions 21sa, 21sb are provided with holes 21a, 21b, respectively. As will be described later, the lock mechanism 30 locks the returnable container 21 using these protrusions 21sa, 21sb. While this is not shown, the returnable container 21 can have a lid that can cover up to the protrusions 21sa, 21sb. When providing such a lid, the lid should have holes at positions corresponding to the respective holes 21a, 21b of the protrusions 21sa, 21sb.

Of course, since the returnable containers 22, 23 are housed on the rails 13 without being distinguished from the returnable container 21, these returnable containers are likewise provided with protrusions in which holes 21a, 21b are provided at the same positions.

For convenience, FIG. 2 shows regions 21c, 21d as other examples of the region to provide the respective holes 21a, 21b. When providing three holes unlike in this example of the configuration, these holes can be, for example, the holes 21a, 21b and a hole provided in the region 21c or the region 21d, and when providing four holes, these holes can be, for example, the holes 21a, 21b and holes respectively provided in the regions 21c, 21d.

The returnable containers 21 to 23 may be provided with a handle for carrying around. This handle for carrying around is different from a drawer handle for using the returnable containers 21 to 23 as drawers. Regarding the returnable container 21, this handle can be described as a through-hole that is provided, for example, near the center of each of the protrusions 21sa, 21sb (between the holes 21a, 21b and near the region 21e) and large enough to put a hand therein to grasp the returnable container 21.

Figure 3:
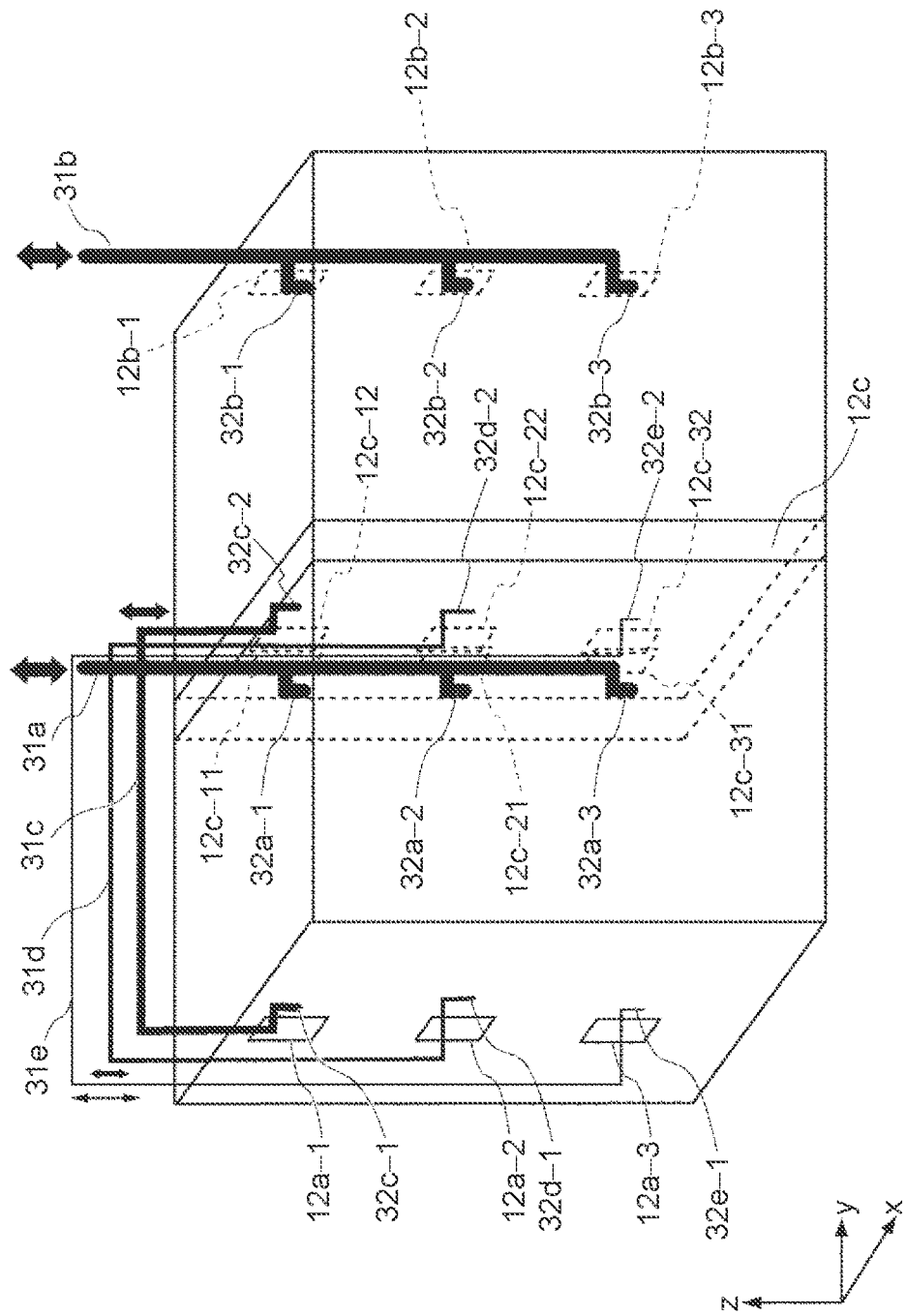
FIG. 3 is a schematic perspective view showing one example of a lock mechanism in the delivery vehicle according to the first embodiment.

Next, details of the mechanisms 30a to 30e composing the lock mechanism 30 will be described with reference to FIG. 3 and FIG. 4. FIG. 3 is a schematic perspective view showing one example of the lock mechanism 30 in the delivery vehicle 1. FIG. 4 is a table showing relationships between stems to be driven and driving directions thereof and locked and unlocked states in the mechanisms 30a to 30e composing the lock mechanism of FIG. 3.

The lock mechanism 30 can include N first shafts corresponding to the mechanisms 30a, 30b and M second shafts corresponding to the mechanisms 30c to 30e. Here, N=2 and M=3 in this example of the configuration.

The first shafts are provided for the respective rows so as to be able to move up and down, and each have a stem that is provided so as to extend across all the M pairs of rails 13 arrayed in the up-down direction and M branches that branch off from the stem so as to correspond to the respective M pairs of rails 13.

In the example of FIG. 3, as the mechanism 30a of FIG. 1, the first shaft for the row on the negative side in the y-axis direction (left side) can have a stem 31a and branches 32a-1, 32a-2, 32a-3. The branch 32a-1 branches off from the stem 31a so as to correspond to one pair of rails 13 in the top tier of the left row. The branch 32a-2 branches off from the stem 31a so as to correspond to one pair of rails 13 in the middle tier of the left row. The branch 32a-3 branches off from the stem 31a so as to correspond to one pair of rails 13 in the bottom tier of the left row.

To allow each of the branches 32a-1, 32a-2, 32a-3 to extend through the partition plate 12c in a state of being able to move up and down, openings 12c-11, 12c-21, 12c-31, respectively, are provided in the partition plate 12c, on the negative side in the y-axis direction.

Similarly, in the example of FIG. 3, as the mechanism 30b of FIG. 1, the first shaft for the row on the positive side in the y-axis direction (right side) can have a stem 31b and branches 32b-1, 32b-2, 32b-3. The branch 32b-1, the branch 32b-2, and the branch 32b-3 branch off from the stem 31b so as to correspond to one pair of rails 13 in the top tier, one pair of rails 13 in the middle tier, and one pair of rails 13 in the bottom tier, respectively, of the right row. To allow each of the branches 32b-1, 32b-2, 32b-3 to extend through the front plate 12b in a state of being able to move up and down, openings 12b-1, 12b-2, 12b-3, respectively, are provided in the front plate 12b, on the negative side in the y-axis direction.

The hole 21b provided in the returnable container 21 is one example of the first hole that engages with one of the branches 32a-1, 32a-2, 32a-3, 32b-1, 32b-2, 32b-3 of the first shafts. In which tier of which row the returnable container 21 is housed determines with which branch the hole 21b engages.

The second shafts are provided for the respective tiers so as to be able to move up and down, and each have a stem that is provided so as to extend across all the N rows of rails 13 arrayed in the width direction of the casing 11 and N branches that branch off from the stem so as to correspond to the respective N rows of rails 13.

In the example of FIG. 3, as the mechanism 30c of FIG. 1, the second shaft for the top tier can have a stem 31c and branches 32c-1, 32c-2. The branch 32c-1 branches off from the stem 31c so as to correspond to one pair of rails 13 in the top tier of the left row. The branch 32c-2 branches off from the stem 31c so as to correspond to one pair of rails 13 in the top tier of the right row.

Similarly, in the example of FIG. 3, as the mechanism 30d of FIG. 1, the second shaft for the middle tier can have a stem 31d and branches 32d-1, 32d-2. The branch 32d-1 branches off from the stem 31d so as to correspond to one pair of rails 13 in the middle tier of the left row. The branch 32d-2 branches off from the stem 31d so as to correspond to one pair of rails 13 in the middle tier of the right row.

Similarly, in the example of FIG. 3, as the mechanism 30e of FIG. 1, the second shaft for the bottom tier can have a stem 31e and branches 32e-1, 32e-2. The branch 32e-1 branches off from the stem 31e so as to correspond to one pair of rails 13 in the bottom tier of the left row. The branch 32e-2 branches off from the stem 31e so as to correspond to one pair of rails 13 in the bottom tier of the right row.

To allow each of the branches 32c-1, 32d-1, 32e-1 to extend through the back plate 12a in a state of being able to move up and down, openings 12a-1, 12a-2, 12a-3, respectively, are provided in the back plate 12a, on the negative side in the y-axis direction. To allow each of the branches 32c-2, 32d-2, 32e-2 to extend through the partition plate 12c in a state of being able to move up and down, openings 12c-12, 12c-22, 12c-32, respectively, are provided in the partition plate 12c, on the positive side in the y-axis direction.

The hole 21a provided in the returnable container 21 is one example of the second hole that engages with one of the branches 32c-1, 32c-2, 32d-1, 32d-2, 32e-1, 32e-2 of the second shafts. In which tier of which row the returnable container 21 is housed determines with which branch the hole 21a engages.

Thus, the lock mechanism 30 is configured such that moving the first shafts up and down can switch between engagement and disengagement between the branches of the first shafts and the first holes, and that moving the second shafts up and down can switch between engagement and disengagement between the branches of the second shafts and the second holes.

Specifically, as shown in FIG. 4, driving the stem 31a having the branches 32a-1, 32a-2 and the stem 31c having the branches 32c-1, 32c-2 so as to move in an upward direction (UP) and driving the other stems 31b, 31d, 31e so as to move in a downward direction (DOWN) creates a state where a housing place on a top left side (in the top tier of the left row) is unlocked while housing places at the other five locations are locked. In the same manner, as shown in FIG. 4, each of the other housing places can be unlocked while the housing places at the other five locations are kept in a locked state. Further, as shown in FIG. 4, moving all the stems 31a, 31b, 31c, 31d, 31e up creates a state where all the housing places are unlocked, and conversely moving all these stems down creates a state where all the housing places are locked.

The form of the stems 31a to 31e and the form of the branches branching off from the stems are not limited to particular forms, and may be any forms that allow switching between engagement with and disengagement from the holes of the returnable containers by moving the stems up and down, and that prevent the stems and the branches from interfering with each other while moving up and down. For example, the branches may engage with the holes of the returnable containers by being moved in the upward direction. In each of the stems 31c to 31e, the branches for the respective rows are connected on an upper side to allow the returnable containers to be easily put in and out from both the positive side in the x-axis direction and the negative side in the x-axis direction. Of course, a form in which the branches for the respective rows are connected on a lower side can also be adopted. Further, in the case of a form in which a side of the rack 10 on the negative side in the x-axis direction is closed, a form in which the branches for the respective rows are connected to the stems 31c to 31e on that side can be adopted. In FIG. 3, the stems 31a to 31e and the branches branching off from these stems are depicted with lines of different thicknesses. This is merely to distinguish them from one another so as to be easily viewable.

Figure 6:
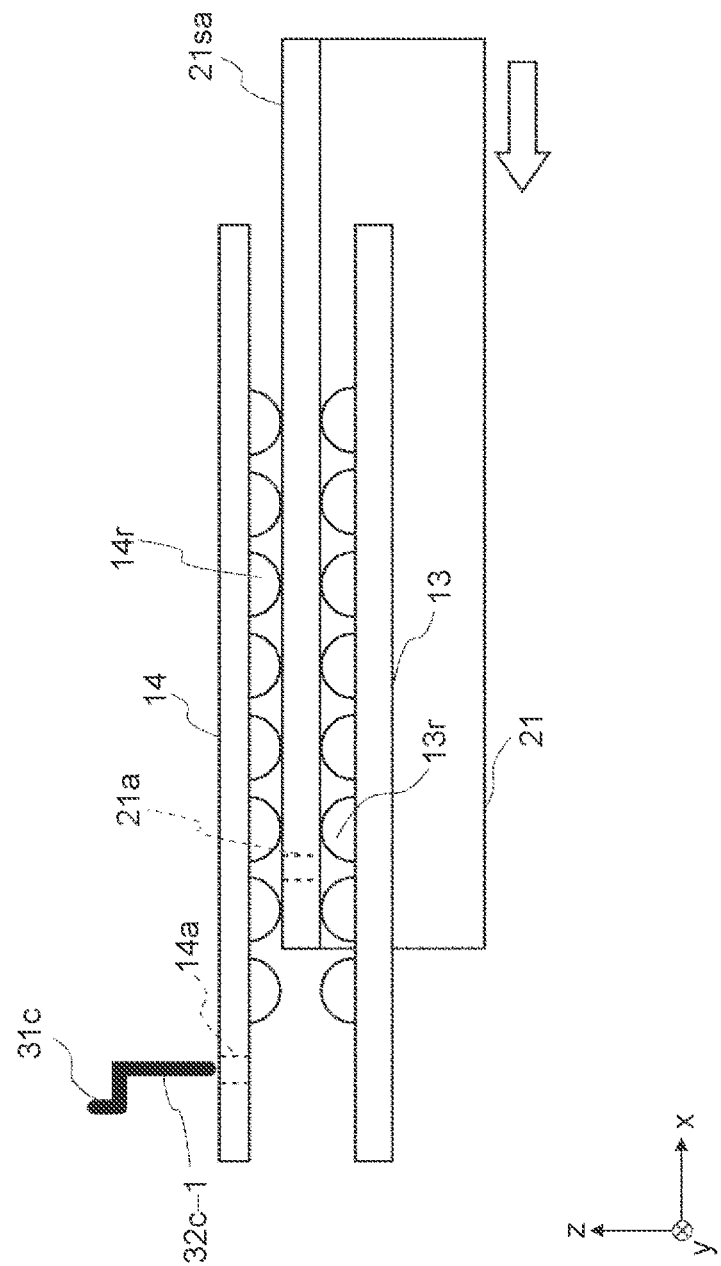
FIG. 6 is a schematic side view showing one example of the rail and the lock mechanism in the delivery vehicle according to the first embodiment.
Figure 7:
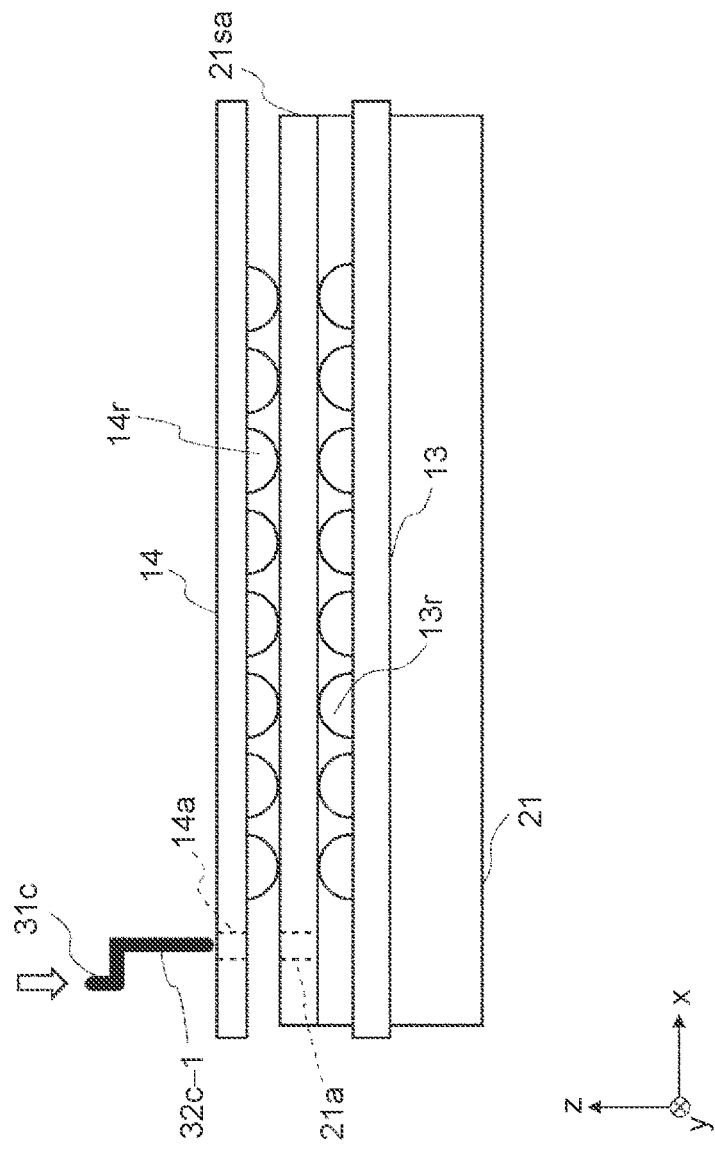
FIG. 7 is a schematic side view showing one example of the rail and the lock mechanism in the delivery vehicle according to the first embodiment.
Figure 8:
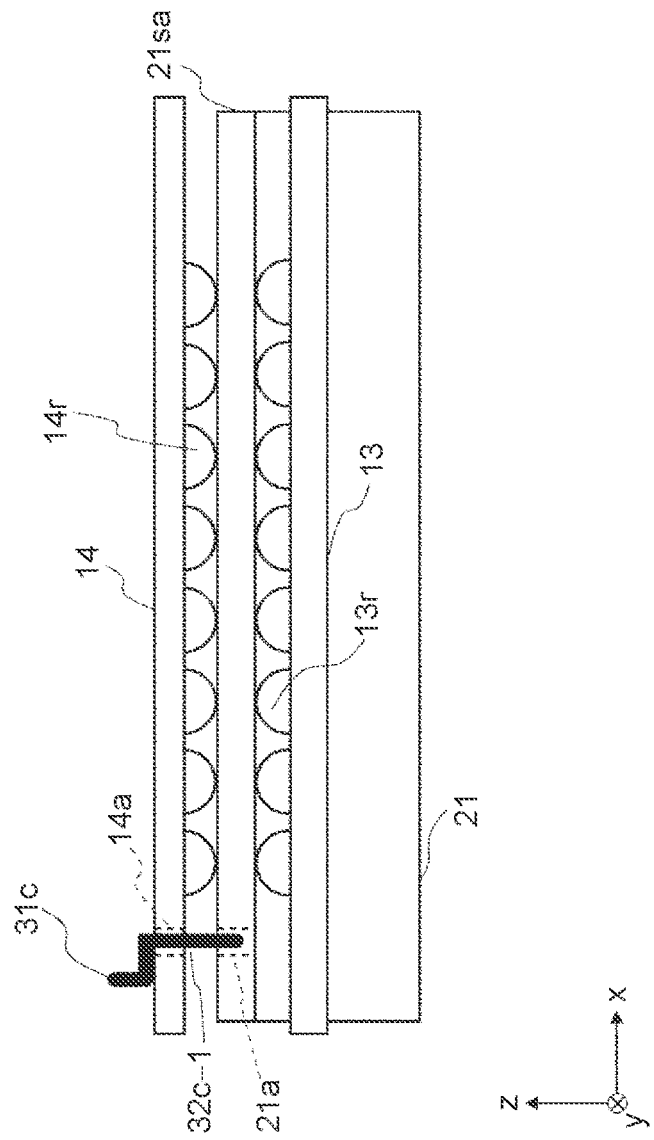
FIG. 8 is a schematic side view showing one example of the rail and the lock mechanism in the delivery vehicle according to the first embodiment.

Next, an example of the structures of the rail 13 and the auxiliary part 14, and how to house the returnable container 21 and lock it by the lock mechanism 30 will be described with reference to FIG. 5 to FIG. 8. FIG. 5 to FIG. 8 are schematic side views showing one example of the rail 13, the stems 31c to 31e of the lock mechanism 30, and the returnable container 21 in the delivery vehicle 1 as seen from the negative side in the y-axis direction of FIG. 1. In FIG. 6 to FIG. 8, only the rail 13 and the auxiliary part 14 in the top tier are shown while other parts are omitted.

As shown in FIG. 5, the rail 13 is a roller rail and includes a plurality of rollers 13r. The rollers 13r are made of plastic, for example. The rollers 13r can reduce the coefficient of friction between a lower surface of the protrusion 21sa of the returnable container 21 and the rail 13, as well as can mitigate generation of abrasion dust resulting from sliding of the protrusion 21sa.

As shown in FIG. 6, the auxiliary part 14 is a part that presses the protrusion 21sa so as to be held between the rail 13 and the auxiliary part 14. The auxiliary part 14 can be a roller rail like the rail 13 and include a plurality of rollers 14r that are made of plastic, for example. The rollers 14r can reduce the coefficient of friction between an upper surface of the protrusion 21sa of the returnable container 21 and the auxiliary part 14, as well as can mitigate generation of abrasion dust resulting from sliding of the protrusion 21sa. When the returnable container 21 is housed, the protrusion 21sb, like the protrusion 21sa, is also held between the rail 13 and the auxiliary part 14.

As indicated by the outlined arrows in FIG. 5, the three second shafts, i.e., the three stems 31c to 31e, are each disposed in such a state as to be able to move up and down separately. For example, the upward and downward motion of the shaft composed of the stem 31c and the branches 32c-1, 32c-2 can be realized by connecting an electric driving source (an actuator or the like) at a predetermined location, such as near an uppermost end of the stem 31c. The same applies to the other second shafts as well as to the other first shafts.

Thus, while this is not shown, the lock mechanism 30 can have driving sources ((N+M) driving sources) that each separately and electrically drive one among the N (in the example of FIG. 3, two) first shafts and the M (in the example of FIG. 3, three) second shafts. In other words, the lock mechanism 30 can have (M+N) electric locks, such as solenoid locks.

As shown in FIG. 5, to secure the space to allow the shafts to move up and down, the auxiliary part 14 in each tier can have a hole (through-hole) 14a into which the corresponding one of the branches 32c-1, 32d-1, 32e-1 is loosely inserted.

In the example of FIG. 3 and FIG. 5, each of the branches 32c-1, 32d-1, 32e-1 has an L-shape that is bent (extended) downward. Thus, for example, lowering the stem 31c causes the branch 32c-1 to engage with the hole 14a and the hole 21a of the returnable container 21, and raising the stem 31c dissolves the engagement.

The holes 21a, 21b can be through-holes but may instead be blind holes. In other words, the branch 32c-1 etc. are shaped to engage in the hole 21a, and for example, the branch 32a-1 etc. are shaped to engage in the hole 21b. These branches may be engaged by, for example, being loosely inserted.

In this embodiment, since the driving sources as described above are provided, it is possible to independently lock and unlock each returnable container while keeping the manufacturing cost down by reducing the number of the driving sources to (M+N), compared with when a lock mechanism is provided that has driving sources for all of a maximum of (M×N) returnable containers that can be housed.

Alternatively, the stems 31c, 31d, 31e and the stems 31a, 31b (not shown) can be provided so as to be able to turn around their axes (shaft axes). Providing such a turning mechanism can prevent the branches from interfering with the protrusions 21sa, 21sb of the returnable container 21 while the protrusions 21sa, 21sb are inserted (housed) or removed. However, instead of adopting such a structure of turning the stems, simply disposing leading ends of the branches and the protrusions with some clearance left therebetween as shown in FIG. 3 and FIG. 5 when disengaging the branches suffices as the structure for preventing interference due to the branches.

For convenience, in FIG. 5 to FIG. 8 that are side views, the positions of the branch, the hole 21a, and the hole 14a in the x-axis direction are shown so as to be different from the position of the stem in the x-axis direction. However, the positions of these parts in the x-axis direction can be aligned with each other, as in FIG. 3 that depicts the branch and the stem parallel to each other at the position where the branch branches off.

Next, regarding the lock mechanism 30 and the returnable container 21 configured as described above, the procedure of locking the returnable container 21 when the returnable container 21 is inserted into the casing 11 will be described. First, the returnable container 21 that is not yet inserted as shown in FIG. 5 is inserted while being slid over the rails 13 as shown in FIG. 6. The returnable container 21 is slid over the rails 13 with the lock thereon released as shown in FIG. 6. Therefore, before the start of insertion and during insertion, all the branches 32c-1, 32d-1, 32e-1 are in a state of having been retracted upward.

In a state where the returnable container 21 is stopped at a predetermined position (housed position) on the rails 13 as shown in FIG. 7, activating the lock mechanism 30 can lock the returnable container 21 as shown in FIG. 8. Specifically, the returnable container 21 is fixed to the casing 11 as the branch 32c-1 moves downward from the state of FIG. 7 and engages in the hole 21a provided in the protrusion 21sa of the returnable container 21. In this case, the branch 32c-1 engages also in the hole 14a provided in the auxiliary part 14. If a lid (not shown) is provided on the returnable container 21, the lid of the returnable container 21 is locked at the same time as the branch 32c-1 is engaged. Of course, when the lock mechanism 30 for the returnable container 21 is released, the returnable container 21 becomes movable again as shown in FIG. 7.

While only the engagement between the hole 21a and the branch 32c-1 has been described above with reference to FIG. 5 to FIG. 8, engagement of the other returnable containers in the other tiers of the other row, including engagement of the branch 32a-1 in the hole 21b provided in the protrusion 21sb of the returnable container 21, is the same. As for the mechanism 30a having the stem 31a and the branches branching off from the stem 31a, as described above, the branches branching off from the stem 31a move up and down at the same time, and the same applies to the mechanism 30b.

While FIG. 3 shows an example in which the first shafts are provided in the regions indicated by the mechanisms 30a, 30b of FIG. 1 and the second shafts are provided in the regions indicated by the mechanisms 30c to 30e of FIG. 1, the configuration is not limited to this example. For example, the lock mechanism 30 may be configured such that some of the stems of the shafts extend along an end on the negative side in the x-axis direction of FIG. 3, for example, such that the stems do not interfere with each other. Also in this case, moving the branches up and down should enable switching between engagement and disengagement between the branches and the holes on the side of the returnable containers.

The example in which, when the branch 32c-1 is engaged, it is engaged also in the hole 14a has been described. However, if the height of the rollers 14r in the z-axis direction is increased, for example, engagement and disengagement of the branch 32c-1 in and from the hole 21a can be switched within the range of the height of the rollers 14r. In this case, the auxiliary part 14 need not be provided with the hole 14a. Further, the rail 13 may be provided with a hole also at a position in the xy-plane corresponding to the hole 14a of the auxiliary part 14, and firm engagement can be established by engaging the branch also in this hole. The rail 13 and the auxiliary part 14 may also include through-holes through which the stem is passed.

As illustrated in FIG. 2 and FIG. 6 to FIG. 8, the holes 21a, 21b may be provided at ends of the protrusions 21sa, 21sb in a longitudinal direction (more preferably, at ends in the depth direction). This configuration allows the returnable container 21 to be locked in a state of having been slid to a fixed position, which can mitigate the concern that the returnable container 21 may be locked in a state of having been slid halfway.

Alternatively, a rotary lock mechanism may be adopted in which the branch 32c-1 etc. have an I-shape (e.g., a shape of being bent perpendicularly from the stem), instead of an L-shape, and are rotated and thereby inserted into holes (recesses) formed by columnar spaces (columnar spaces with a semicircular cross-section) provided in side surfaces of the protrusions 21sa, 21sb. In this case, the thicknesses of the protrusions 21sa, 21sb are increased to form the recesses.

As has been described above, in the delivery vehicle 1 according to the embodiment, the lock mechanism 30 includes the N first shafts for the respective rows and the M second shafts for the respective tiers that have the branches and can be moved up and down as described above. The lock mechanism 30 is configured such that moving the first shafts up and down can switch between engagement and disengagement between the branches of the first shafts and the first holes, and that moving the second shafts up and down can switch between engagement and disengagement between the branches of the second shafts and the second holes.

In the lock mechanism 30, therefore, disengaging the first hole of one returnable container and the branch of the first shaft from each other and disengaging the second hole of this returnable container and the branch of the second shaft from each other can release the lock on only this one returnable container. This means that the lock mechanism 30 makes it possible to release the lock on only one of the returnable containers each housed on one of the M pairs of rails 13 in the N rows.

In the lock mechanism 30, each of the N first shafts and the M second shafts can be moved up and down by the driving source. Thus, compared with a lock mechanism in which a driving source is provided for each of (M×N) pairs of supports, the number of the driving sources can be reduced by {M×N−(M+N)}, so that the manufacturing cost of the rack 10 as well as the manufacturing cost of the delivery vehicle 1 can be kept down.

While it is preferable in terms of management and delivery operation that the interval B at which the rails (supports) 13 are disposed be equal among the rows, the interval B may also be varied among the rows. The widths of the rows (distances in the y-axis direction) may be varied, but making the widths equal allows for efficient delivery.

The embodiment has been described based on the assumption that the rack 10 can house all the returnable containers (e.g., the returnable containers 21 to 23) of two or more prespecified sizes. Of course, even when the rack 10 is a rack that can house returnable containers of one prespecified size, delivery using these returnable containers of one size can be streamlined and the same effects of the lock mechanism can be achieved. While this is not shown, when a rack that can house returnable containers of one prespecified size is adopted, M pairs of rails (supports) 13 are arrayed at regular intervals in the height direction (z-axis direction) in each row as in the embodiment, and this regular interval is set to be nearly equal to the height of the returnable containers of one size.

Further, the embodiment is based on the assumption that the M pairs of supports are arrayed in M tiers at regular intervals in the up-down direction and that each of the N first shafts and the M second shafts is moved up and down (moved in the up-down direction) by the driving source. Alternatively, the M pairs of supports may be provided in M tiers at regular intervals in the left-right direction (one of horizontal directions that is perpendicular to the depth direction), and these supports may be arrayed in N rows in the up-down direction of the casing, and each of the N first shafts and the M second shafts may be moved left and right (moved in the left-right direction) by the driving source. This configuration can achieve the same effects. Thus, the M pairs of supports can be provided inside the casing so as to extend in the depth direction and arrayed in M (M is an integer not less than three) tiers at regular intervals in a predetermined direction that is one of the up-down direction and the left-right direction, and these supports are arrayed in N (N is an integer not less than two) rows in an orthogonal direction orthogonal to the predetermined direction of the casing.

Although this will not be described in detail, the rack of such a configuration is, for example, the rack 10 of FIG. 1 turned 90 degrees counterclockwise, for which returnable containers that are open at the upper side can be adopted. Alternatively, adopting returnable containers having a lid to close the opening can eliminate the likelihood of articles falling out of the returnable containers.

As has been described above, in this embodiment, the rack that can house all returnable containers of one or more prespecified sizes adopts the configuration in which moving one or more of the shafts of which the number (M+N) is smaller than the number (M×N) of the pairs of rails 13 in the predetermined direction can release the lock on one of the returnable containers. Thus, this configuration has fewer parts that are activated to release the lock, which makes it possible to independently and easily lock and unlock each returnable container while keeping the manufacturing cost down as much as possible.

While the embodiment has been described based on the assumption that the first shafts and the second shafts are electrically driven by the driving sources, the embodiment can also adopt a lock mechanism that manually locks and unlocks without having a driving source. For example, the lock mechanism 30 may be a mechanism that mechanically and manually activates the stems 31a, 31b, 31c, 31d, 31e each having the branches. Thus, the lock mechanism 30 is not limited to a mechanism including a solenoid lock, and may be any mechanism that can restrict the motion of the returnable containers including the returnable container 21 and lock the returnable containers.

In the embodiment, also when such a configuration of manually locking and unlocking the returnable containers is adopted, providing at most as many operating parts as the number of the shafts for a plurality of objects to be locked suffices, so that the manufacturing cost can be kept down. Moreover, in this case, the operating parts for locking and unlocking the returnable containers can be collected in a common region, which has the advantage of facilitating the operation.

The delivery vehicle 1 can be, for example, an autonomous (driverless) vehicle. The depth direction of the rack 10 in the delivery vehicle 1 corresponds to the left-right direction or the front-rear direction of the vehicle. When the vehicle is not an autonomous vehicle, since the driver's seat is commonly disposed on the front side, the inner side in the depth direction is the side of the driver's seat in the left-right direction.

If the delivery vehicle 1 is an autonomous vehicle, delivery costs can be reduced. For example, the delivery vehicle 1 can travel on sidewalks and the like, let alone roads, and can deliver the returnable containers 21 to 23 to the vicinity of a place where they are unloaded or a place where they are transferred. When the vehicle becomes unable to travel autonomously, for example, the delivery vehicle 1 may be remotely operated. A delivery person may drive the delivery vehicle 1, and may carry the articles (i.e., the returnable containers 21 to 23) to a place where the articles are transferred from the delivery vehicle 1 and transfer them. The place to which the returnable containers 21 to 23 are transferred may be, for example, a rack similar to the rack 10.

It is also possible to house articles in the returnable containers 21 to 23 with, for example, an order identification information id attached thereto, and deliver the articles in this state. The order identification information id attached to the returnable containers 21 to 23 is, for example, a character, symbol, barcode, two-dimensional code, or radio frequency identifier (RFID). For example, a reader (not shown) that can read the order identification information id attached to the returnable containers 21 to 23 can be provided in the rack 10 of the delivery vehicle 1 or at other part of the delivery vehicle 1. Thus, the control unit of the delivery vehicle 1 can also perform control such that the lock on a returnable container to be unloaded is released by specifying the order identification information id.

Second Embodiment

Figure 9:
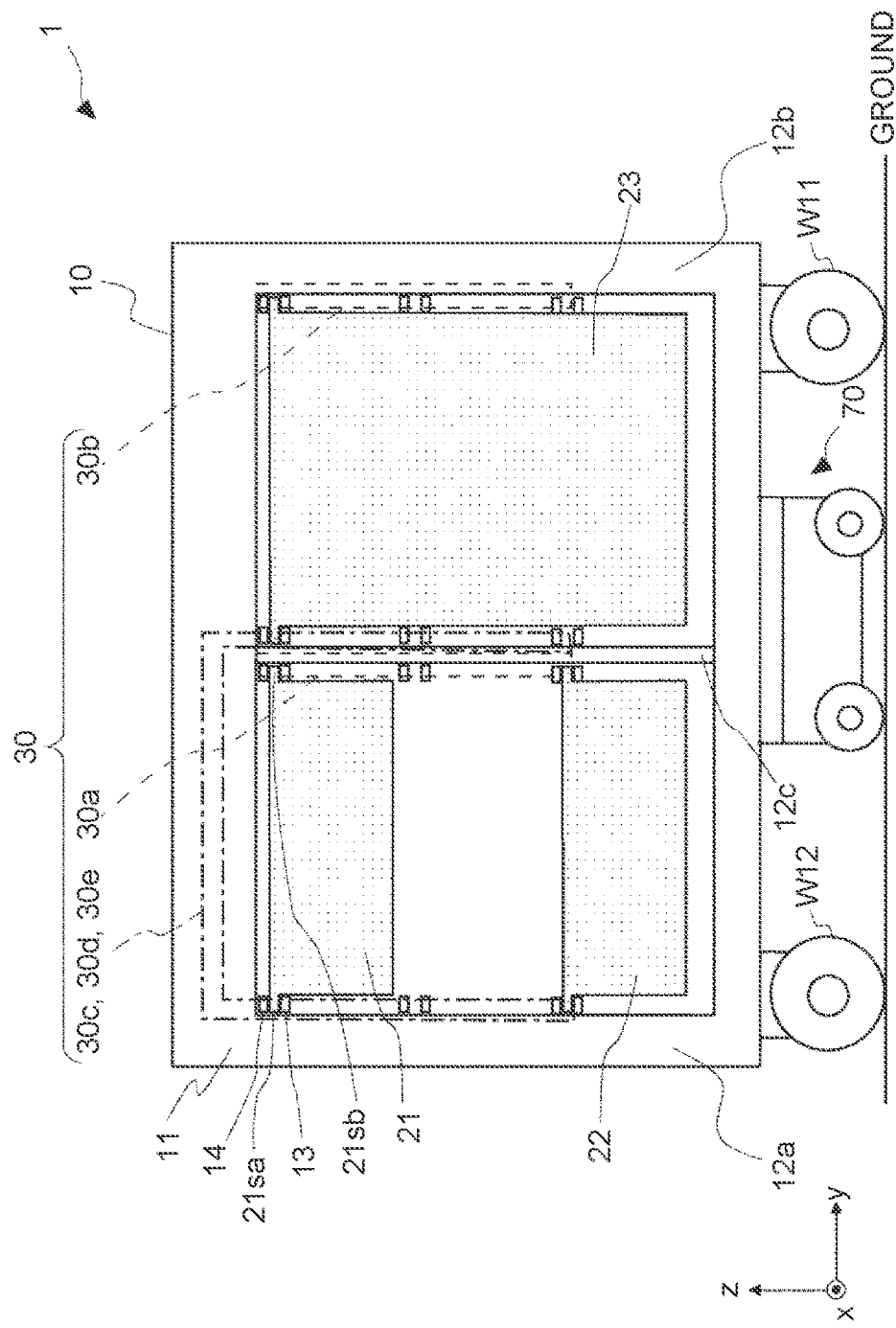
FIG. 9 is a schematic side view of a delivery vehicle according to a second embodiment.

Next, a delivery vehicle according to a second embodiment will be described with reference to FIG. 9 and FIG. 10. FIG. 9 is a schematic side view of the delivery vehicle according to the second embodiment, and FIG. 10 is a schematic side view of a transfer robot.

As shown in FIG. 9, in this embodiment, while the delivery vehicle 1 delivers the returnable containers 21 to 23, a transfer robot 70 may be housed under the delivery vehicle 1 and mechanically or electromagnetically coupled thereto. The transfer robot 70 is an autonomous vehicle that, after the delivery vehicle 1 arrives in the vicinity of a delivery rack similar to the rack 10, transfers the returnable containers 21 to 23 (i.e., the articles) from the delivery vehicle 1 to that delivery rack. If the lock mechanism 30 is electrically controllable, each returnable container can be easily locked and unlocked at the time of loading and unloading for transfer.

Figure 10:
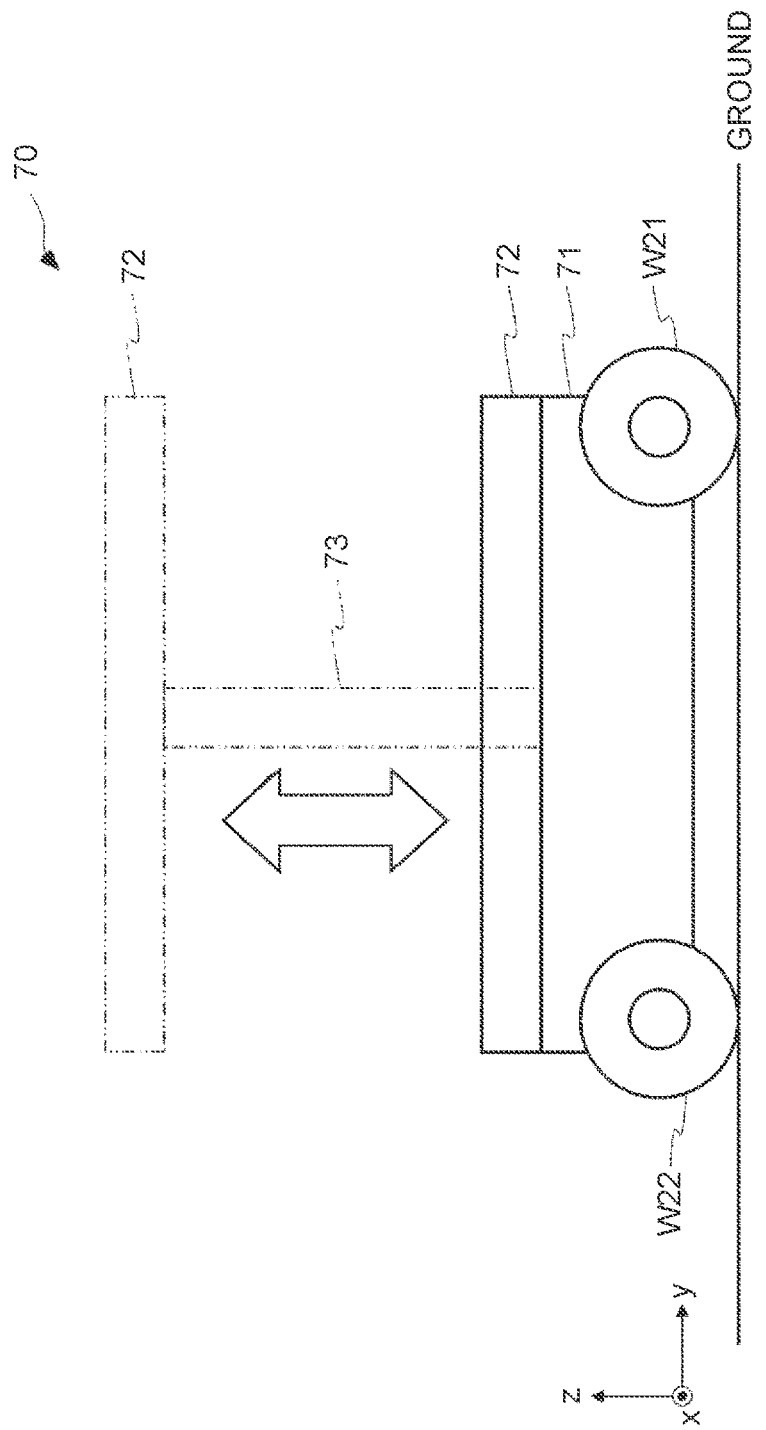
FIG. 10 is a schematic side view of a transfer robot.

As shown in FIG. 10, the transfer robot 70 includes wheels W21, W22, a main body 71, a top plate 72, and a pillar 73. The two pairs of wheels W21, W22 are rotatably fixed under the main body 71 and driven by a driving source (not shown), such as a motor.

As shown in FIG. 10, the top plate 72 is coupled to the main body 71 through an extendable-contractable pillar 73. The top plate 72 is coupled at an upper end of the pillar 73, and the transfer robot 70 transfers the returnable containers 21 to 23 with the returnable containers 21 to 23 placed on the top plate 72. The pillar 73 has, for example, a telescopic extending-contracting mechanism and is extended and contracted by a driving source (not shown), such as a motor. As indicated by the outlined arrow in FIG. 10, changing the length of the pillar 73 can change the level of the top plate 72. Therefore, the returnable containers 21 to 23 can be transferred from any housing place in the delivery vehicle 1 to any housing place in the delivery rack.

Here, the transfer robot 70 includes a manipulator (not shown), for example, and using the manipulator, moves the returnable containers 21 to 23 from the delivery vehicle 1 to the top plate 72 and thus transfers them. Then, using the manipulator, the transfer robot 70 moves the returnable containers 21 to 23 from the top plate 72 to the delivery rack.

In the configuration shown in FIG. 9, the transfer robot 70 may serve as a power source to move the delivery vehicle 1. This means that the delivery vehicle 1 need not have a driving source for driving the wheels W11, W12. In this case, a plurality of (e.g., two) transfer robots 70 may be provided side by side in the y-axis direction to move the delivery vehicle 1. The transfer robot 70 may be mounted on the delivery vehicle 1 or travel alongside the delivery vehicle 1.

The configuration of the second embodiment is otherwise the same as that of the first embodiment and therefore will not be further described. The various application examples described in the first embodiment are applicable also in this embodiment.

Third Embodiment

Figure 11:
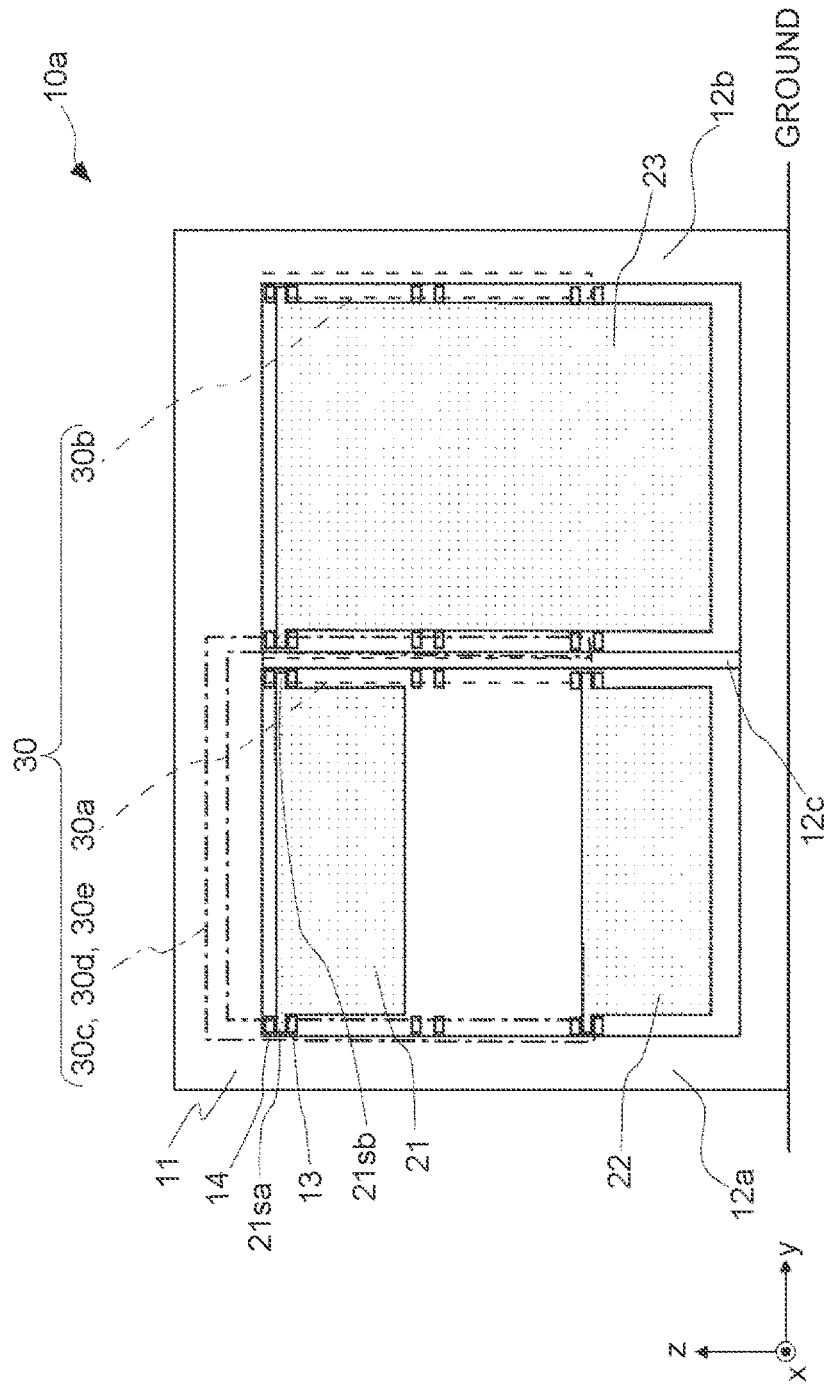
FIG. 11 is a schematic side view showing one example of a delivery rack according to a third embodiment.

FIG. 11 is a schematic front view showing one example of a delivery rack according to a third embodiment. As shown in FIG. 11, a delivery rack 10a according to this embodiment can adopt the same configuration as the rack 10 mounted on the delivery vehicle 1 of FIG. 1 and FIG. 9. While this will not be described in detail, the delivery rack 10a can include a casing 11, a partition plate 12c, rails 13, auxiliary parts 14, and a lock mechanism 30.

The delivery rack 10a according to this embodiment can be installed as a place to which the returnable containers 21 to 23 are moved from the delivery vehicle 1, or can be installed as a rack in which the returnable containers 21 to 23 to be delivered by the delivery vehicle 1 are stored beforehand. Thus, the delivery rack 10a can be used as a receiving place and a sending place in delivering articles using the returnable containers 21 to 23. In the delivery rack 10a, the returnable containers 21 to 23 that have become empty after the articles have been taken out can be collected as appropriate by the delivery vehicle 1.

The delivery rack 10a can also be provided outdoors. As an example of outdoor usage, the delivery rack 10a may be installed in the entrance or a corridor of an apartment complex. Further, the delivery rack 10a may be installed in a house, and may be provided indoors. The term "house" here covers an apartment complex, an office building, etc.

The delivery rack 10a may be provided so as to extend through an outer wall of a house. This configuration makes it possible to carry the delivered returnable containers 21 to 23 into the delivery rack 10a from outdoors, and to take the returnable containers 21 to 23 out of the delivery rack 10a on an inside of a residential space. The term "residential space" here covers an office space. In this case, for example, an outer door and an inner door (not shown) that can be opened and closed may be provided on an outdoor side and an indoor side of the delivery rack 10a, and an interlock mechanism that prevents the outer door and the inner door from opening at the same time may be provided. This can protect the privacy of people living in the house.

In addition, the various application examples described in the first and second embodiments are applicable also to the delivery rack according to this embodiment.

Others

In the above examples, the various control programs can be stored using various types of non-transitory computer-readable media and supplied to a computer. Non-transitory computer-readable media include various types of tangible storage media. Examples of non-transitory computer-readable media include a magnetic recording medium (e.g., a flexible disc, magnetic tape, and hard disk drive), a magneto-optical recording medium (e.g., a magneto-optical disk), a CD-ROM, a CD-R, a CD-R/W, and a semiconductor memory (e.g., a mask ROM, programmable ROM (PROM), erasable PROM (EPROM), flash ROM, and RAM). Alternatively, the programs may be supplied to a computer by various types of transitory computer-readable media. Examples of transitory computer-readable media include electric signals, optical signals, and electromagnetic waves. Transitory computer-readable media can supply the programs to a computer through a wire communication channel, such as a wire or an optical fiber, or a wireless communication channel.

The present disclosure is not limited to the above-described embodiments but can be changed as appropriate within a range that does not depart from the gist of the disclosure. For example, the height of the returnable container to be housed is not limited to being nearly a multiple of the interval B, if streamlining of delivery is not pursued and housing the returnable containers so as to be spaced apart in a predetermined direction (in FIG. 1, the height direction) is tolerated. In the example where three pairs of rails 13 are provided as in FIG. 1, returnable containers of which the heights are, for example, 0.5, 1.5, or 2.7 times the interval B can also be housed.

What is claimed is:

1. A delivery rack comprising:
    a casing;
    M pairs of supports, with M being an integer not less than three, that are provided inside the casing so as to extend in a depth direction and arrayed in M tiers at regular intervals in a predetermined direction that is one of an up-down direction and a left-right direction; and
    a lock mechanism that locks returnable containers housed while being supported so as to be slidable along the respective M pairs of supports,
    the delivery rack being able to house all the returnable containers of one or more prespecified sizes, wherein:
    the M pairs of supports are arrayed in N rows, with N being an integer not less than two, in an orthogonal direction orthogonal to the predetermined direction of the casing, and the delivery rack is able to house a maximum of (M×N) returnable containers;
    the lock mechanism includes:
    N first shafts that are provided for the respective rows so as to be movable in the predetermined direction, and each have a stem that is provided so as to extend across all the M pairs of supports arrayed in the predetermined direction and M branches that branch off from the stem so as to correspond to the respective M pairs of supports; and
    M second shafts that are provided for the respective tiers so as to be movable in the predetermined direction, and each have a stem that is provided so as to extend across all the N rows of supports arrayed in the orthogonal direction of the casing and N branches that branch off from the stem so as to correspond to the respective N rows of supports;

the returnable containers are each provided with a first hole that engages with the branch of the first shaft and a second hole that engages with the branch of the second shaft; and moving the first shafts in the predetermined direction enables switching between engagement and disengagement between the branches of the first shafts and the first holes, and moving the second shafts in the predetermined direction enables switching between engagement and disengagement between the branches of the second shafts and the second holes.

2. The delivery rack according to claim 1, wherein:

protrusions that protrude from the returnable container toward outer sides in the orthogonal direction slide over the supports; and the first hole and the second hole are provided in the protrusions.

3. The delivery rack according to claim 1, wherein the lock mechanism has driving sources that each separately and electrically drive one among the N first shafts and the M second shafts.

4. A delivery vehicle comprising a rack, wherein:

the rack has:
- a casing;
- M pairs of supports, with M being an integer not less than three, that are provided inside the casing so as to extend in a depth direction and arrayed in M tiers at regular intervals in a predetermined direction that is one of an up-down direction and a left-right direction; and
- a lock mechanism that locks returnable containers housed while being supported so as to be slidable along the respective M pairs of supports;

the rack is able to house all the returnable containers of one or more prespecified sizes;

the M pairs of supports are arrayed in N rows, with N being an integer not less than two, in an orthogonal direction orthogonal to the predetermined direction of the casing, and the rack is able to house a maximum of (M×N) returnable containers;

the lock mechanism includes:
- N first shafts that are provided for the respective rows so as to be movable in the predetermined direction, and each have a stem that is provided so as to extend across all the M pairs of supports arrayed in the predetermined direction and M branches that branch off from the stem so as to correspond to the respective M pairs of supports; and
- M second shafts that are provided for the respective tiers so as to be movable in the predetermined direction, and each have a stem that is provided so as to extend across all the N rows of supports arrayed in the orthogonal direction of the casing and N branches that branch off from the stem so as to correspond to the respective N rows of supports;

the returnable containers are each provided with a first hole that engages with the branch of the first shaft and a second hole that engages with the branch of the second shaft; and moving the first shafts in the predetermined direction enables switching between engagement and disengagement between the branches of the first shafts and the first holes, and moving the second shafts in the predetermined direction enables switching between engagement and disengagement between the branches of the second shafts and the second holes.

5. The delivery vehicle according to claim 4, wherein:

protrusions that protrude from the returnable container toward outer sides in the orthogonal direction slide over the supports; and the first hole and the second hole are provided in the protrusions.

6. The delivery vehicle according to claim 4, wherein the lock mechanism has driving sources that each separately and electrically drive one among the N first shafts and the M second shafts.

7. The delivery vehicle according to claim 4, wherein the delivery vehicle is an autonomous vehicle.

* * * * *